(12) United States Patent
Dahar (10) Patent No.: US 12,496,169 B2
(45) Date of Patent: Dec. 16, 2025

(54) ADJUSTABLE ORTHODONTIC ASSEMBLY

(71) Applicant: Nicholas Dahar, Jeannette, PA (US)

(72) Inventor: Nicholas Dahar, Jeannette, PA (US)

( * ) Notice: Subject to any disclaimer, the term of this patent is extended or adjusted under 35 U.S.C. 154(b) by 431 days.

(21) Appl. No.: 18/134,226

(22) Filed: Apr. 13, 2023

(65) Prior Publication Data
US 2024/0341923 A1 Oct. 17, 2024

(51) Int. Cl.
*A61C 7/22* (2006.01)
*A61C 7/16* (2006.01)

(52) U.S. Cl.
CPC . *A61C 7/22* (2013.01); *A61C 7/16* (2013.01)

(58) Field of Classification Search
CPC .. A61C 7/16; A61C 7/28; A61C 7/285; A61C 7/14; A61C 7/287; A61C 7/34; A61C 7/22
See application file for complete search history.

(56) References Cited

U.S. PATENT DOCUMENTS

| | | | |
|---|---|---|---|
| 4,243,387 A | 1/1981 | Prins | |
| 4,487,581 A * | 12/1984 | Adler | A61C 7/30 433/16 |
| 4,676,746 A | 6/1987 | Klapper | |
| 7,306,458 B1 | 12/2007 | Lu | |
| 7,431,586 B1 | 10/2008 | Silverman | |
| D660,436 S | 5/2012 | Dupray | |
| 8,366,440 B2 | 2/2013 | Bathen et al. | |
| 9,119,693 B2 | 9/2015 | Rahimi | |
| 2009/0117510 A1 * | 5/2009 | Minium | A61C 7/28 433/10 |
| 2016/0143707 A1 * | 5/2016 | Rahimi | A61C 7/146 433/24 |

* cited by examiner

*Primary Examiner* — Eric J Rosen
*Assistant Examiner* — Luis Ruiz Martin (57) ABSTRACT

An adjustable orthodontic assembly for orthodontic alignment of teeth includes a base that may be adhered to a tooth in a person's mouth. A retention unit is removably coupled to the base. The retention unit has a wire slot therein to engage a wire thereby facilitating the retention unit to selectively tighten the wire. In this way the retention unit facilitates orthodontic adjustment of teeth. The retention unit is vertically and horizontally movable on the base. Moreover, the retention unit is selectively retained at a selected point of rotation on the base for tightening the wire.

12 Claims, 6 Drawing Sheets

ADJUSTABLE ORTHODONTIC ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

(2) Description of Related Art Including Information Disclosed Under 37 CFR 1.97 and 1.98

The disclosure and prior art relates to orthodontic devices and more particularly pertains to a new orthodontic device for orthodontic alignment of teeth.

BRIEF SUMMARY OF THE INVENTION

An embodiment of the disclosure meets the needs presented above by generally comprising a base that may be adhered to a tooth in a person's mouth. A retention unit is removably coupled to the base. The retention unit has a wire slot therein to engage a wire thereby facilitating the retention unit to selectively tighten the wire. In this way the retention unit facilitates orthodontic adjustment of teeth. The retention unit is vertically and horizontally movable on the base. Moreover, the retention unit is selectively retained at a selected point of rotation on the base for tightening the wire.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

With reference now to the drawings, and in particular to FIGS. 1 through 7 thereof, a new orthodontic device embodying the principles and concepts of an embodiment of the disclosure and generally designated by the reference numeral 10 will be described.

As best illustrated in FIGS. 1 through 7, the adjustable orthodontic assembly 10 generally comprises a base 12 that may be adhered to a tooth 14 in a person's mouth. The base 12 may be adhered to the tooth 14 with an orthodontic adhesive of any conventional design. The base 12 has a first surface 15, a second surface 16 and a peripheral edge 18 extending therebetween. The peripheral edge 18 has a top side 20, a bottom side 22, a first lateral side 24 and a second lateral side 26.

Figure 3:
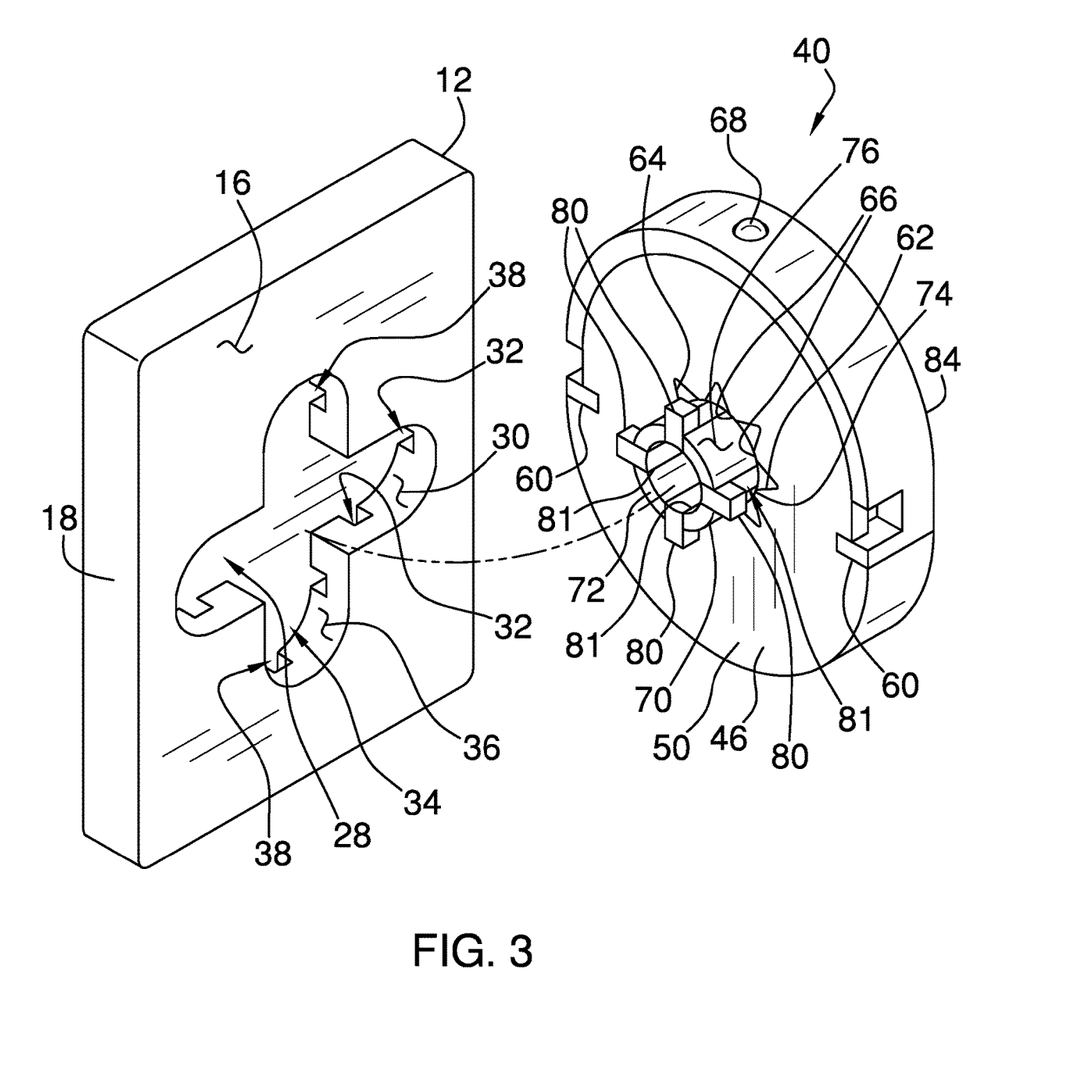
FIG. 3 is an exploded perspective view of an embodiment of the disclosure.

As illustrated in FIG. 3, the second surface 16 has a first well 28 extending toward the first surface 15 and the first well 28 has a first bounding surface 30. The first well 28 is horizontally oriented and is centrally positioned on the second surface 16. Moreover, the first well 28 is elongated between each of the first lateral side 24 and the second lateral side 26 of the base 12. The first bounding surface 30 has a plurality of first slots 32 extending inwardly therein. The first slots 32 are spaced apart from each other and are distributed around an entire perimeter of the first well 28.

The second surface 16 has a second well 34 extending toward the first surface 15 and the second well 34 has a second bounding surface 36. The second well 34 is vertically oriented and is centrally positioned on the second surface 16. Additionally, the second well 34 intersects the first well 28 such that each of the first well 28 and the second well 34 forms a plus. The second well 34 is elongated between each of the top side 20 and the bottom side 22 of the base 12. The second bounding surface 36 has a plurality of second slots 38 extending inwardly therein. The second slots 38 are spaced apart from each other and are distributed around an entire perimeter of the second well 34.

Figure 1:
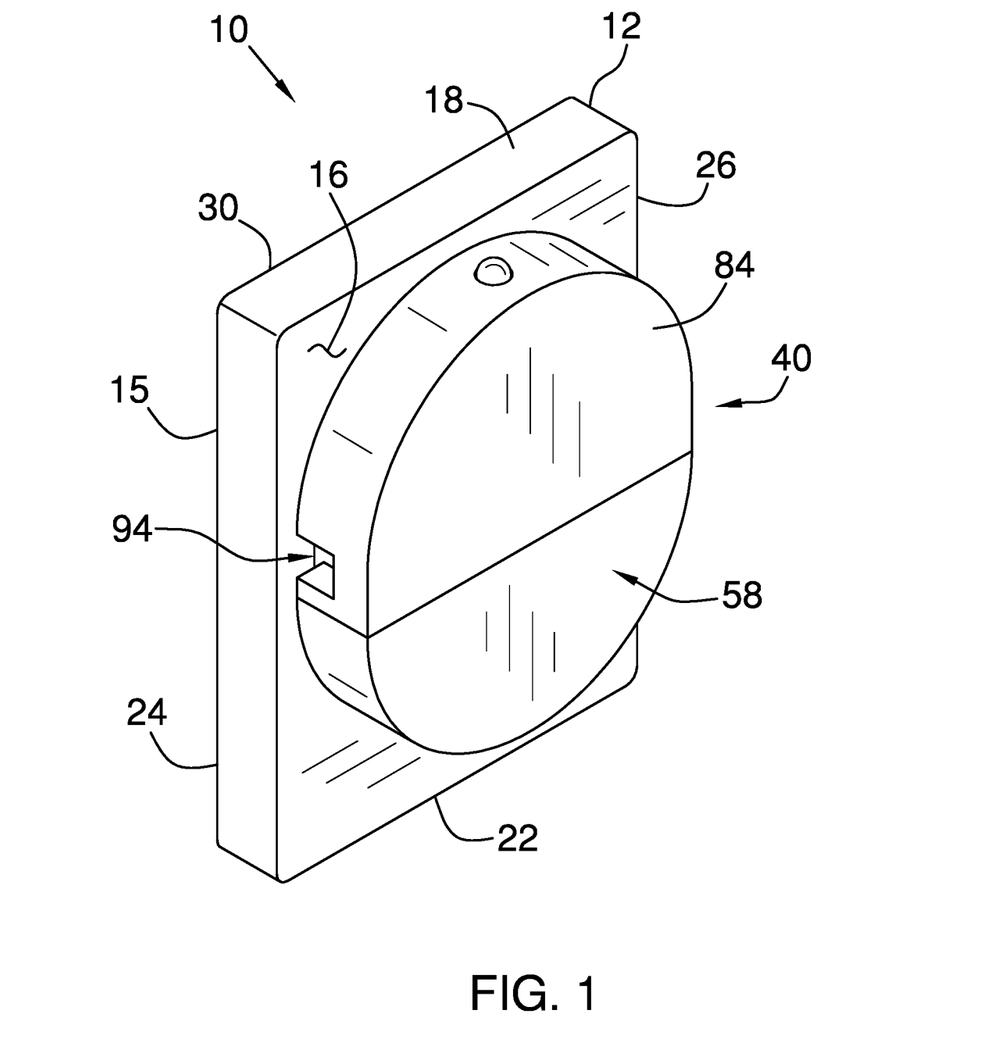
FIG. 1 is a front perspective view of an adjustable orthodontic assembly according to an embodiment of the disclosure.
Figure 2:
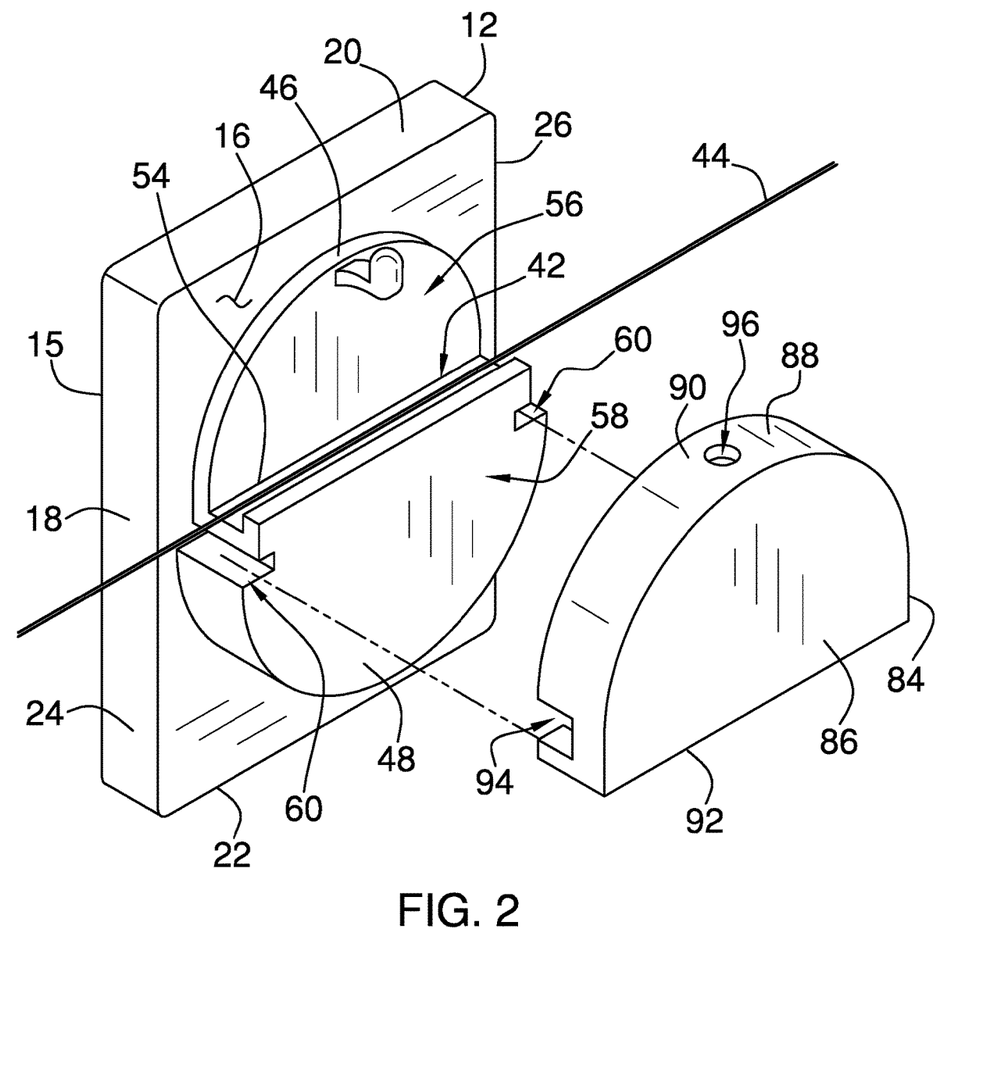
FIG. 2 is a front exploded perspective view of an embodiment of the disclosure.

As illustrated in FIG. 2, a retention unit 40 is removably coupled to the base 12. The retention unit 40 has a wire slot 42 therein to engage a wire 44. The retention unit 40 is selectively manipulated to tighten the wire 44 for facilitating orthodontic adjustment of the teeth 14 in the person's mouth. The wire 44 may be wire 44 for orthodontic braces or the like. The retention unit 40 is vertically and horizontally adjustable on the base 12. Additionally, the retention unit 40 is selectively retained at a selected point of rotation on the base 12 for tightening the wire 44.

The retention unit 40 comprises a plate 46 that has a first side 48, a second side 50 and a perimeter edge 52 extending therebetween. The perimeter edge 52 is continuous such that the plate 46 has a circular shape. The first side 48 has a first edge 54 extending horizontally between a top half 56 and a bottom half 58 of the first side 48. Moreover, the top half 56 is recessed with respect to the bottom half 58. The bottom half 58 extends upwardly beyond the first edge 54 to define the wire slot 42 extending along the first edge 54. The wire 44 associated with maxillary brackets from the gingival and mandibular brackets from the occlusal is positioned in the wire slot 42 from above the plate 46 rather than from below the plate 46 thereby enhancing efficiency for an orthodontist.

Figure 5:
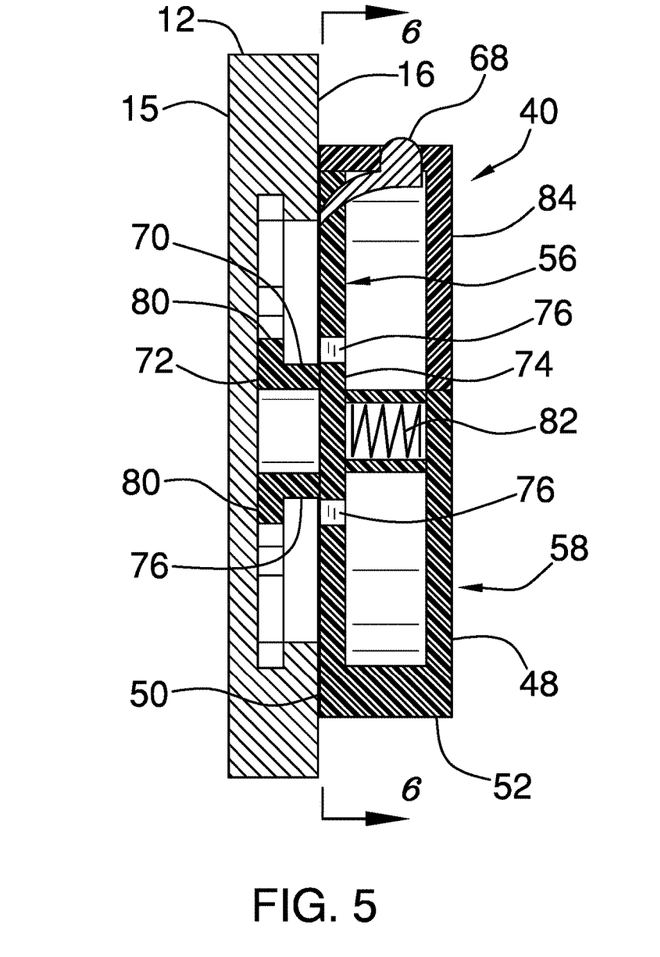
FIG. 5 is a cross sectional view taken along line 5-5 of FIG. 4 of an embodiment of the disclosure.

As illustrated in FIG. 5, the perimeter edge 52 corresponding to the top half 56 is inset with respect to the perimeter edge 52 corresponding to the bottom half 58. The perimeter edge 52 corresponding to the bottom half 58 has a pair of grooves 60 extending inwardly therein. Each of the grooves 60 is positioned on opposite sides of the plate 46 with respect to each other and each of the grooves 60 is positioned beneath the wire slot 42. The second side 50 has an aperture 62 extending toward the first side 48 and the aperture 62 has a bounding surface 64. The bounding surface 64 of the aperture 62 has an alternating sequence of valleys 65 and hills 66 that are spaced apart from each other and are distributed around the bounding surface 64 of the aperture 62.

As illustrated in FIG. 5, a pin 68 is movably coupled to the top half 56 of the plate 46 and the pin 68 extends upwardly from the top half 56. A tube 70 is provided that has a first end 72, a second end 74 and an outer surface 76 extending therebetween and the tube 70 is rotatably positioned in the aperture 62. The outer surface 76 has a plurality of teeth 78 extending outwardly therefrom. The teeth 78 are spaced apart from each other and are distributed around the tube 70 and each of the teeth 78 is aligned with the second end 74. Each of the teeth 78 engages the valleys 65 in the bounding surface 64 of the aperture 62 such that the tube 70 is retained at a selected point of rotation in the aperture 62.

Figure 4:
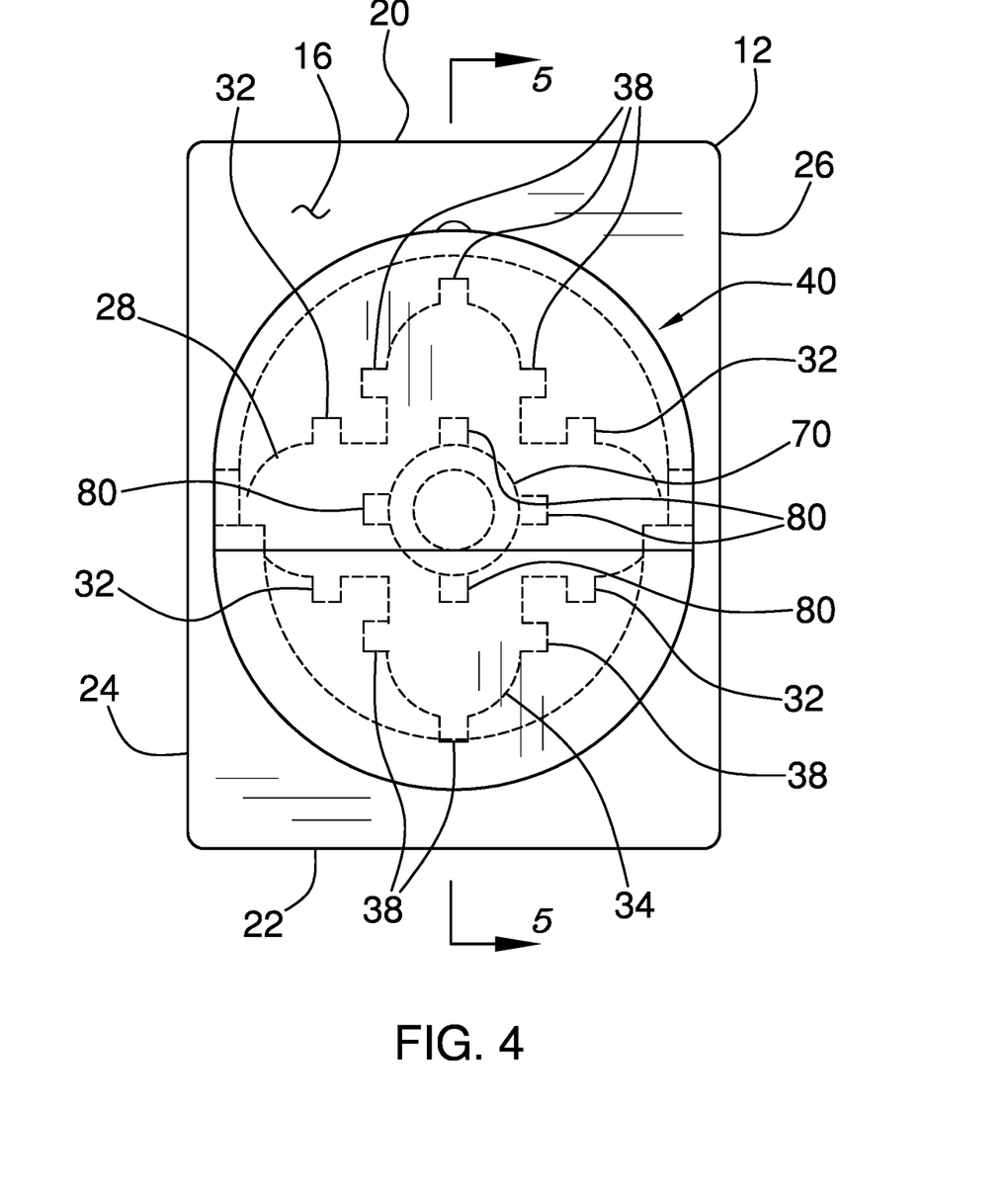
FIG. 4 is a front phantom view of an embodiment of the disclosure.

As illustrated in FIGS. 3 and 4, the outer surface 76 has a plurality of tabs 80 extending outwardly therefrom. The tabs 80 are spaced apart from each other and are distributed around the tube 70 and each of the tabs 80 is aligned with the first end 72 of the tube 70. Additionally, each of the tabs 80 may be pivotally coupled to the tube 70. The tube 70 may have a plurality of channels 81 and each of the channels 81 may be aligned with an associated one of the tabs 80. In this way each of the tabs 80 may be selectively pivoted to be recessed into the associated channel 81 such that the tabs are flush with the outer surface 76 of the tube 70. The tube 70 is positioned in a selected one of the first well 28 and the second well 34 in the base 12 having each of the tabs 80 engaging selected ones of the first slots 32 and the second slots 38 in the base 12.

As illustrated in FIGS. 2 and 3, the tube 70 is selectively positioned in a first position in the first well 28 having the plate 46 being positioned closer to the top side 20 than the bottom side 22 of the base 12. The tube 70 is selectively positioned in a second position in the first well 28 having the plate 46 being positioned closer to the bottom side 22 than the top side 20 of the base 12. The tube 70 is selectively positioned in third position in the second well 34 having the plate 46 being positioned closer to the first lateral side 24 than the second lateral side 26 of the base 12. The tube 70 is selectively positioned in a fourth position having the plate 46 being positioned closer to the second lateral side 26 than the first lateral side 24 of the base 12. Moreover, the teeth 78 on the tube 70 retain the plate 46 at a selected point of rotation on the base 12 when the teeth 78 are positioned in the selected valleys 65. In this way the plate 46 is rotated about an axis extending through the first 72 and second 74 ends of the tube 70 for tightening the wire 44.

Figure 6:
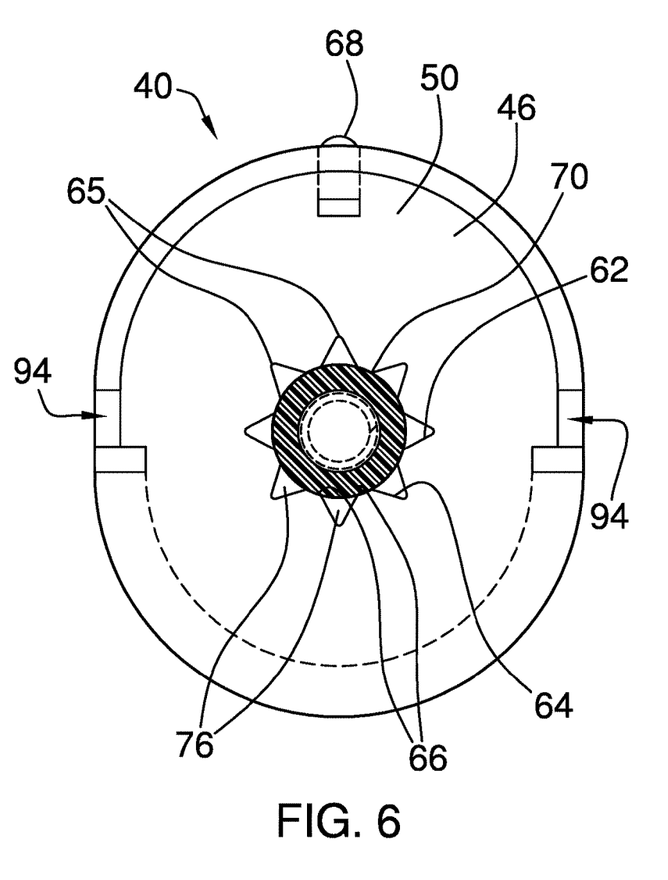
FIG. 6 is a cross sectional view taken along line 6-6 of FIG. 5 of an embodiment of the disclosure.

As illustrated in FIGS. 5 and 6, a spring biasing member 82 is positioned within the aperture 62 and the spring biasing member 82 biases the tube 70 inwardly into the aperture 62. In this way the teeth 78 are retained in the selected valleys 65. The plate 46 is gripped and is selectively urged away from the base 12 when the tube 70 is positioned in a selected one of the first, second, third and fourth positions. Thus, the plate 46 may be rotated into the selected point of rotation on the base 12.

As illustrated in FIG. 2, a cover 84 is provided that has a first wall 86 and a perimeter wall 88 extending away therefrom. The perimeter wall 88 has a first side 90 and a second side 92 and the first side 90 of the perimeter wall 88 is concavely arcuate with respect to the second side 92. The second side 92 is open and the first side 90 has a pair of openings 94 extending therethrough. Each of the openings 94 is positioned on opposite sides of the cover 84 and each of the openings 94 is aligned with the second side 50 of the cover 84.

As illustrated in FIG. 2, the cover 84 is positioned on the top half 56 of the plate 46 having the wire 44 extending outwardly through each of the openings 94. In this way the cover 84 retains the wire 44 in the wire 44 groove. The first side 90 of the perimeter wall 88 of the cover 84 has an aperture 96 extending therethrough and the aperture 96 on the cover 84 is centrally positioned on the first side 48. The pin 68 engages the aperture 96 in the cover 84 when the cover 84 is positioned on the plate 46 to retain the cover 84 on the plate 46.

Figure 7:
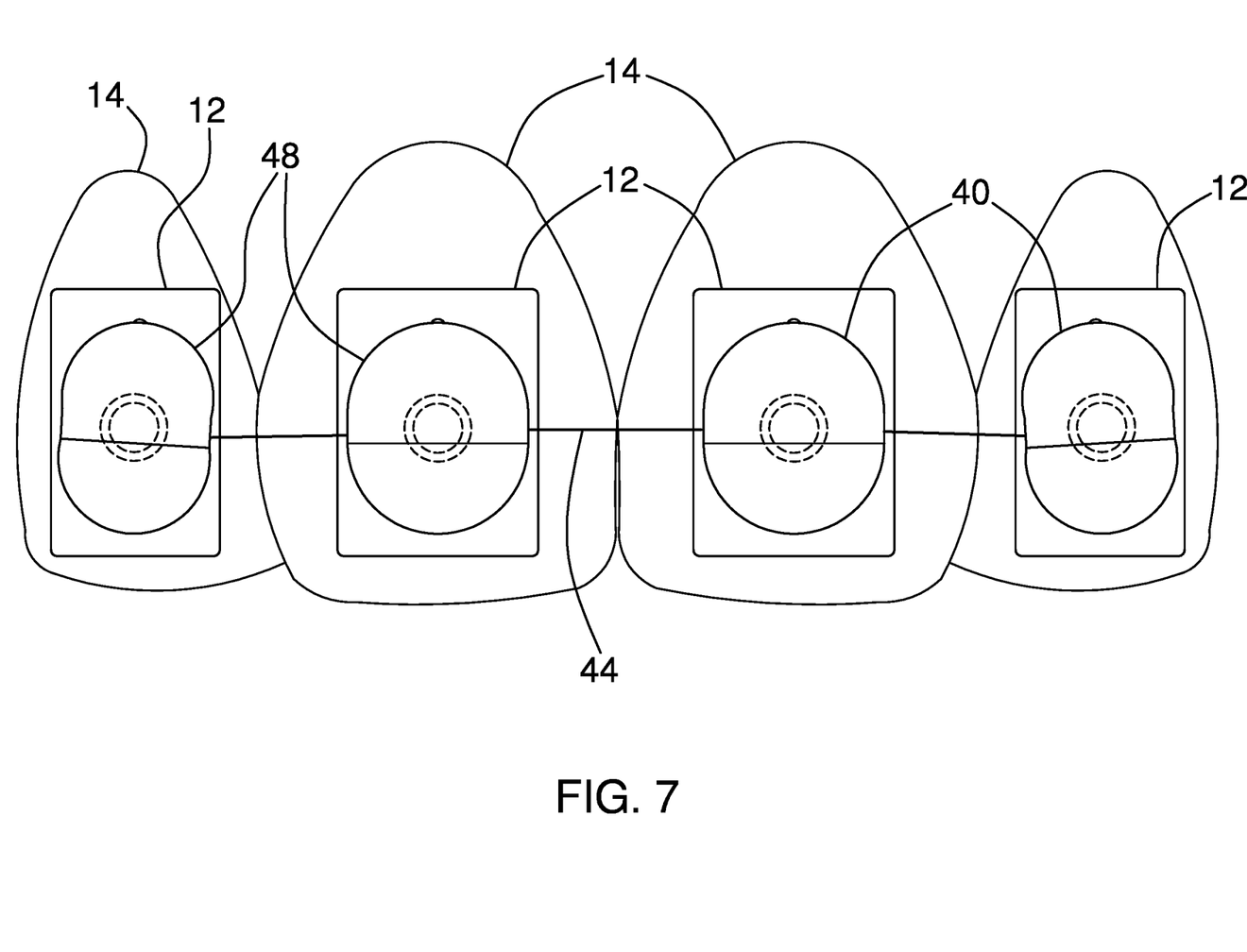
FIG. 7 is a perspective in-use view of an embodiment of the disclosure.

As illustrated in FIG. 7, a plurality of the bases 12 and retention units 40 is provided and each of the bases 12 is adhered to an associated one of the teeth 78 in the person's mouth. Each of the retention units 40 is positioned in a selected one of the first, second, third and fourth positions thereby facilitating the wire 44 to be oriented level along the teeth 78 in the person's mouth. Additionally, plurality of retention units 40 facilitates adjustment of the wire tension and re-positioning of the retention units 40 on the teeth on the person's mouth. In this way the bases 12 and retention units 40 eliminate the need for removing and replacing traditional orthodontic braces.

In use, the first surface 15 corresponding to each of the bases 12 is adhered to an associated one of the teeth 14 in the person's mouth. The tube 70 corresponding to each of the retention units 40 is inserted into a selected one of the first 28 and second 34 wells in the corresponding base 12. Additionally, the tube 70 is positioned in a selected one of the first, second, third and fourth positions in the corresponding base 12. The wire 44 is positioned in the wire slot 42 in the plate 46 corresponding to each of the retention units 40.

The plate 46 corresponding to each of the retention units 40 is gripped and urged away from the corresponding base 12 thereby facilitating the plate 46 corresponding to each of the retention units 40 to be rotated. In this way the wire 44 is tightened according to the orthodontist's recommendations for aligning the teeth 14 in the user's mouth. The plate 46 corresponding to each of the retention unit 40s is released when the wire 44 is tightened thereby facilitating the teeth 78 on the tube 70 of the corresponding retention unit 40 to engage the plate 46 of the corresponding retention unit 40. In this way the wire 44 is retained at a selected tension across the teeth 14 in the user's mouth. The cover 84 corresponding to each of the retention unit 40s is positioned on the plate 46 of the corresponding retention unit 40 to retain the wire 44 in each of the retention units 40.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. An adjustable orthodontic assembly being configured for aligning teeth, said assembly comprising:
    a base being configured to be adhered to a tooth; and
    a retention unit being removably coupled to said base, said retention unit having a wire slot therein wherein said wire slot is configured to engage a wire thereby facilitating said retention unit to selectively tighten the wire for facilitating orthodontic adjustment of teeth, said wire slot being positioned on a top of said retention unit wherein said wire slot is configured to have the wire positioned therein from above said retention unit rather than from below said retention unit, said retention unit being vertically and horizontally movable on said base, said retention unit being selectively retained at a selected point of rotation on said base for tightening the wire; wherein said base has a first surface, a second surface and a peripheral edge extending therebetween, said peripheral edge having a top side, a bottom side, a first lateral side and a second lateral side, said second surface having a first well extending toward said first surface; wherein said first well has a first bounding surface, said first well being horizontally oriented and being centrally positioned on said second surface, said first well being elongated between each of said first lateral side and said second lateral side of said base; wherein said first bounding surface has a plurality of first slots extending inwardly therein, said first slots being spaced apart from each other and being distributed around an entire perimeter of said first well; wherein said second surface has a second well extending toward said first surface, said second well having a second bounding surface, said second well being vertically oriented and being centrally positioned on said second surface such that said second well intersects said first well having each of said first well and said second well forming a plus, said second well being elongated between each of said top side and said bottom side of said base; and wherein said second bounding surface has a plurality of second slots extending inwardly therein, said second slots being spaced apart from each other and being distributed around an entire perimeter of said second well.

2. The assembly according to claim 1, wherein said retention unit comprises a plate having a first side, a second side and a perimeter edge extending therebetween, said perimeter edge being continuous such that said plate has a circular shape, said first side having a first edge extending horizontally between a top half and a bottom half of said first side such that said top half is recessed with respect to said bottom half, said bottom half extending upwardly beyond said first edge to define said wire slot extending along said first edge.

3. The assembly according to claim 2, wherein said perimeter edge corresponding to said top half is inset with respect to said perimeter edge corresponding to said bottom half, said perimeter edge corresponding to said bottom half having a pair of grooves extending inwardly therein, each of said grooves being positioned on opposite sides of said plate with respect to each other, each of said grooves being positioned beneath said wire slot.

4. The assembly according to claim 2, wherein said second side has an aperture extending toward said first side, said aperture having a bounding surface, said bounding surface of said aperture having an alternating sequence of valleys and hills being spaced apart from each other and being distributed around said bounding surface of said aperture.

5. The assembly according to claim 2, further comprising a pin being movably coupled to said top half of said plate, said pin extending upwardly from said top half.

6. The assembly according to claim 4, further comprising a tube having a first end, a second end and an outer surface extending therebetween, said tube being rotatably positioned in said aperture, said outer surface having a plurality of teeth extending outwardly therefrom, said teeth being spaced apart from each other and being distributed around said tube, each of said teeth being aligned with said second end, each of said teeth engaging said valleys in said bounding surface of said aperture such that said tube is retained at a selected point of rotation in said aperture.

7. The assembly according to claim 6, wherein:
    said outer surface has a plurality of tabs extending outwardly therefrom, said tabs being spaced apart from each other and being distributed around said tube, each of said tabs being aligned with said first end of said tube, said tube being positioned in a selected one of said first well and said second well in said base having each of said tabs engaging selected ones of said first slots and said second slots in said base.

8. The assembly according to claim 7, wherein:
    said tube is selectively positioned in a first position in said first well having said plate being positioned closer to a top side than a bottom side of said base;
    said tube being selectively positioned in a second position in said first well having said plate being positioned closer to said bottom side than said top side of said base;

said tube being selectively positioned in third position in said second well having said plate being positioned closer to a first lateral side than a second lateral side of said base; and said tube being selectively positioned in a fourth position having said plate being positioned closer to said second lateral side than said first lateral side of said base, said teeth on said tube retaining said plate at a selected point of rotation on said base when said teeth are positioned in said selected valleys for tightening the wire.

9. The assembly according to claim 8, further comprising a biasing member being positioned within said aperture, said biasing member biasing said tube inwardly into said aperture such that said teeth are retained in said selected valleys, said plate being selectively urged away from said base when said tube is positioned in a selected one of said first position, said second position, said third position and said fourth position thereby facilitating said plate to be rotated into said selected point of rotation on said base.

10. The assembly according to claim 3, further comprising a cover having a first wall and a perimeter wall extending away therefrom, said perimeter wall having a first side and a second side, said first side of said perimeter wall being concavely arcuate with respect to said second side, said second side being open, said first side having a pair of openings extending therethrough, each of said openings being positioned on opposite sides of said cover, each of said openings being aligned with said second side of said cover.

11. The assembly according to claim 10, wherein said cover is positioned on said top half of said plate having the wire extending through each of said openings wherein said cover is configured to retain the wire in said wire groove, said first side of said perimeter wall of said cover having an aperture extending therethrough, said aperture on said cover being centrally positioned on said first side, said aperture in said cover engaging a pin when said cover is positioned on said plate to retain said cover on said plate.

12. An adjustable orthodontic assembly being configured for aligning teeth, said assembly comprising:

a base being configured to be adhered to a tooth, said base having a first surface, a second surface and a peripheral edge extending therebetween, said peripheral edge having a top side, a bottom side, a first lateral side and a second lateral side, said second surface having a first well extending toward said first surface, said first well having a first bounding surface, said first well being horizontally oriented and being centrally positioned on said second surface, said first well being elongated between each of said first lateral side and said second lateral side of said base, said first bounding surface having a plurality of first slots extending inwardly therein, said first slots being spaced apart from each other and being distributed around an entire perimeter of said first well, said second surface having a second well extending toward said first surface, said second well having a second bounding surface, said second well being vertically oriented and being centrally positioned on said second surface such that said second well intersects said first well having each of said first well and said second well forming a plus sign, said second well being elongated between each of said top side and said bottom side of said base, said second bounding surface having a plurality of second slots extending inwardly therein, said second slots being spaced apart from each other and being distributed around an entire perimeter of said second well; and a retention unit being removably coupled to said base, said retention unit having a wire slot therein wherein said wire slot is configured to engage a wire thereby facilitating said retention unit to selectively tighten the wire for facilitating orthodontic adjustment of teeth, said wire slot being positioned on a top of said retention unit wherein said wire slot is configured to have the wire positioned therein from above said retention unit rather than from below said retention unit, said retention unit being vertically and horizontally movable on said base, said retention unit being selectively retained at a selected point of rotation on said base for tightening the wire, said retention unit comprising:

a plate having a first side, a second side and a perimeter edge extending therebetween, said perimeter edge being continuous such that said plate has a circular shape, said first side having a first edge extending horizontally between a top half and a bottom half of said first side such that said top half is recessed with respect to said bottom half, said bottom half extending upwardly beyond said first edge to define said wire slot extending along said first edge, said perimeter edge corresponding to said top half being inset with respect to said perimeter edge corresponding to said bottom half, said perimeter edge corresponding to said bottom half having a pair of grooves extending inwardly therein, each of said grooves being positioned on opposite sides of said plate with respect to each other, each of said grooves being positioned beneath said wire slot, said second side having an aperture extending toward said first side, said aperture having a bounding surface, said bounding surface of said aperture having an alternating sequence of valleys and hills being spaced apart from each other and being distributed around said bounding surface of said aperture;

a pin being movably coupled to said top half of said plate, said pin extending upwardly from said top half, a tube having a first end, a second end and an outer surface extending therebetween, said tube being rotatably positioned in said aperture, said outer surface having a plurality of teeth extending outwardly therefrom, said teeth being spaced apart from each other and being distributed around said tube, each of said teeth being aligned with said second end, each of said teeth engaging said valleys in said bounding surface of said aperture such that said tube is retained at a selected point of rotation in said aperture, said outer surface having a plurality of tabs extending outwardly therefrom, said tabs being spaced apart from each other and being distributed around said tube, each of said tabs being aligned with said first end of said tube, said tube being positioned in a selected one of said first well and said second well in said base having each of said tabs engaging selected ones of said first slots and said second slots in said base, said tube being positioned in a first position in said first well having said plate being positioned closer to said top side than said bottom side of said base, said to being positioned in a second position in said first well having said plate being positioned closer to said bottom side than said top side of said base, said tube being positioned in third position in said second well having said plate being positioned closer to said first lateral side than said second lateral side of said base, said tube being positioned in a fourth position having said plate being positioned closer to said second lateral side than said first lateral side of said base, said teeth on said tube retaining said plate at a selected point of rotation on said base when said teeth are positioned in said selected valleys for tightening the wire, a biasing member being positioned within said aperture, said biasing member biasing said tube inwardly into said aperture such that said teeth are retained in said selected valleys, said plate being selectively urged away from said base when said tube is positioned in a selected one of said first position, said second position, said third position and said fourth position thereby facilitating said plate to be rotated into said selected point of rotation on said base, and a cover having a first wall and a perimeter wall extending away therefrom, said perimeter wall having a first side and a second side, said first side of said perimeter wall being concavely arcuate with respect to said second side, said second side being open, said first side having a pair of openings extending therethrough, each of said openings being positioned on opposite sides of said cover, each of said openings being aligned with said second side of said cover, said cover being positioned on said top half of said plate having the wire extending outwardly through each of said openings wherein said cover is configured to retain the wire in said wire groove, said first side of said perimeter wall of said cover having an aperture extending therethrough, said aperture on said cover being centrally positioned on said first side, said pin engaging said aperture in said cover when said cover is positioned on said plate to retain said cover on said plate.

* * * * *